United States Patent [19]
Sasaki et al.

[11] Patent Number: 4,719,508
[45] Date of Patent: Jan. 12, 1988

[54] ENDOSCOPIC PHOTOGRAPHING APPARATUS

[75] Inventors: Masahiko Sasaki; Shinichi Kato; Tadashi Kato; Masahide Kanno; Yutaka Takahashi; Katsuyuki Saito, all of Tokyo, Japan

[73] Assignee: Olympus Optical Co., Ltd., Japan

[21] Appl. No.: 914,183

[22] Filed: Oct. 1, 1986

[30] Foreign Application Priority Data

Oct. 2, 1985 [JP] Japan ................ 60-219536
Oct. 8, 1985 [JP] Japan ................ 60-224395
Oct. 8, 1985 [JP] Japan ................ 60-224396
Oct. 18, 1985 [JP] Japan ................ 60-233088

[51] Int. Cl.$^4$ .................... A61B 1/04; A61B 1/06
[52] U.S. Cl. .......................... 358/98; 128/4; 128/6; 358/11; 358/140
[58] Field of Search ............. 358/98, 140, 11; 128/4, 128/6

[56] References Cited

U.S. PATENT DOCUMENTS

| | | | |
|---|---|---|---|
| 4,253,447 | 3/1981 | Moore | 128/6 |
| 4,335,395 | 6/1982 | Clarke | 358/11 |
| 4,532,546 | 7/1985 | Aufiero et al. | 358/140 |
| 4,593,313 | 6/1986 | Nagasaki | 358/98 |
| 4,633,303 | 12/1986 | Nagasaki | 358/98 |
| 4,654,701 | 3/1987 | Yabe | 358/98 |

Primary Examiner—Howard W. Britton

[57] ABSTRACT

An endoscopic photographing apparatus comprises a first frame memory for successively storing the image signals, generated from a solid-state image sensor with every scanning line, in synchronism with drive signals, and a second frame memory for successively storing the image signals, read successively from the first frame memory, by the interlacing method, and delivering the stored image signals to a monitor, in synchronism with television synchronizing signals, for display.

8 Claims, 15 Drawing Figures

F I G. 5
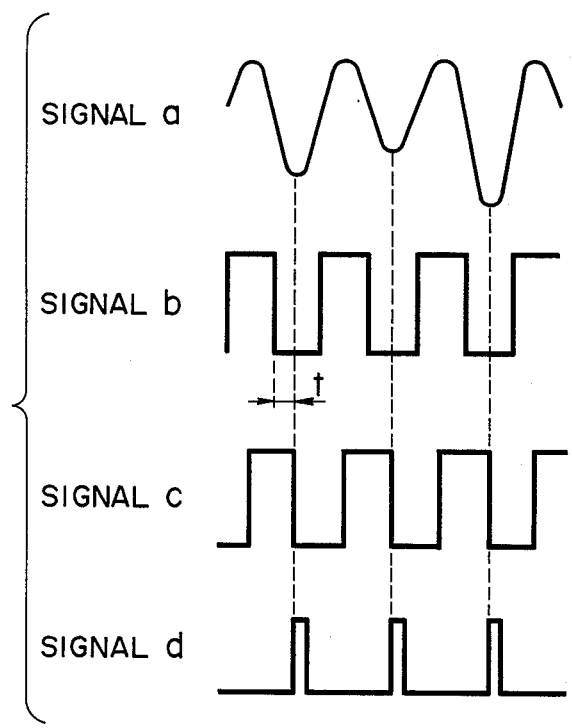

ENDOSCOPIC PHOTOGRAPHING APPARATUS

BACKGROUND OF THE INVENTION

The present invention relates to a photographing apparatus, and more specifically to an endoscopic photographing apparatus for photographing an endoscopic image.

In conventional endoscopic photographing apparatuses, three-primary-color image signals are delivered successively from a CCD pickup device, at intervals of 1/90 second, according to the frame-sequential system. After they are subjected to analog-to-digital conversion, the signals are stored individually in R, G and B pre-stage frame memories. The R, G and B image signals from the pre-stage memories are then transferred to and stored in R, G and B post-stage frame memories, respectively. While the pre-stage memories are engaged in writing operation, the image signals cannot be written in the post-stage memories. The image signals from the pre-stage memories are partially transferred to and stored in their corresponding post-stage memories, at the same time, during the period between the end of the successive storage in one of the pre-stage memories, and the start of storage in the subsequent frame memory. Thus, the image signals are stored in the post-stage memories, while being partially rewritten at intervals of 1/90 second. The image signals R, G and B, stored in the R, G and B post-stage frame memories, are read out simultaneously at intervals of 1/30 second, in synchronism with television synchronizing signals, and displayed as a color picture on a monitor.

According to the prior art photographing apparatus, the post-stage frame memories are partially rewritten with every 1/60 second in monochro picture mode, and then if the subject moves quickly, the image is displayed separated in up and down. That is, as shown in FIG. 14A, when a subject moves from f0 to f1, the upper half of image f0 and the lower half of image f1 are displayed as on frame as shown in f0/f1. In color picture, the post-stage frame memories are partially rewrited with every 1/90 second. In this case, when the subject moves from one position (f0) to the other position (f1), each of R, G, and B images changes to f0, f0/f1, f0/f1 and f1 in this order as shown in FIG. 14B. When the three fundamental color images R, G, and B represented by f0/f1 and f0/f1 are combined to obtain a color picture, the color picture is displayed as an RGB image with color breakup. Such display picture will be a substantial offense to the eye, suffering flickers.

SUMMARY OF THE INVENTION

The object of the present invention is to provide an endoscopic photographing apparatus capable of producing an image with reduced flickers.

According to the present invention, there is provided an endoscopic photographing apparatus, which comprises a first frame memory for successively storing the image signals, generated from a solid-state image pickup element with every scanning line, in synchronism with drive signals; and second frame memory for successively storing the image signals, read successively from the first frame memory, by the interlacing method, and delivering the stored image signals to a monitor, in synchronism with television synchronizing signals, for display.

The image signals are stored in the second frame memory, connected to the monitor, by the interlacing method. Accordingly, when the second frame memory is rewritten, two mixed images, one obtained by even scanning lines and the other by odd scanning lines, are stored as a single frame picture. Thus, when the image signals, read from the second frame memory, are displayed on the monitor, one image changes gradually into another, without entailing any substantial flickers.

BRIEF DESCRIPTION OF THE DRAWINGS

FIG. 5 shows waveforms of signals used in the circuit of FIG. 4;

DETAILED DESCRIPTION OF THE PREFERRED EMBODIMENT

Figure 1:
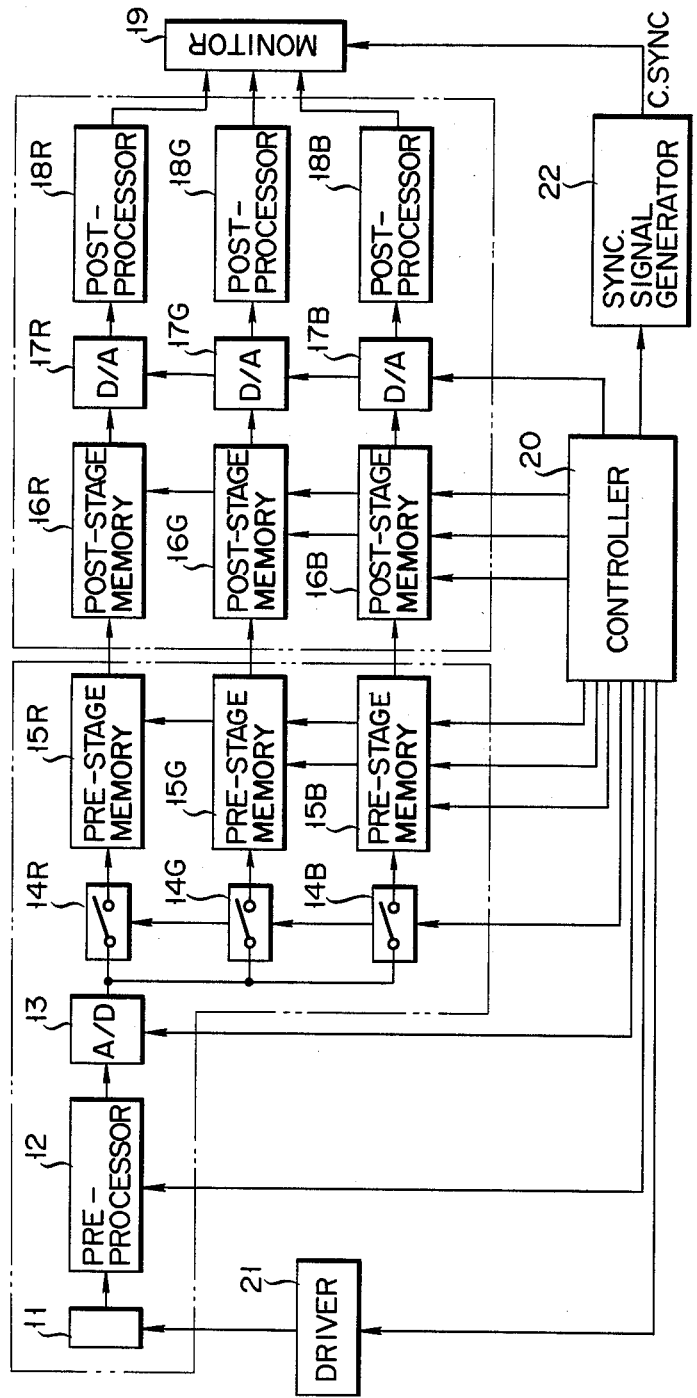
FIG. 1 is a block circuit diagram of an endoscopic photographing apparatus according to an embodiment of the present invention.

Referring now to FIG. 1, an image sensor, formed of, e.g., CCD 11, delivers R, G and B image signals according to the frame-sequential system. An output terminal of CCD 11 is connected to switch circuit section 14 through pre-processor 12 and A/D converter 13. Section 14 includes switches 14R, 14G and 14B, which make switching actions to feed the R, G and B image signals successively to R, G and B pre-stage frame memories (FM1) 15R, 15G and 15B, respectively.

Pre-stage frame memories 15R, 15G and 15B are coupled to write-in inputs of post-stage frame memories (FM2) 16R, 16G and 16B, respectively. Readout outputs of memories 16R, 16G and 16B are connected to post-processors 18R, 18G and 18B via D/A converters 17R, 17G and 17B, respectively. The post-processors serve to process image signals from the post-stage frame memories. The respective outputs of the post-processors are connected to monitor 19.

Pre- and post-stage frame memories 15R, 15G, 15B, 16R, 16G and 16B, pre-processor 12, A/D converter 13, and D/A converters 17R, 17G and 17B are connected to controller 20 including readout circuits for pre- and post-stage frame memories, comprising, e.g., a CPU. Controller 20, which is connected to CCD 11 via driver 21, controls the drive of CCD 11. Controller 20 is connected to sync. signal generator 22 for supplying a C. SYNC (composite syncronous) signal to the monitor 19.

Figure 2:
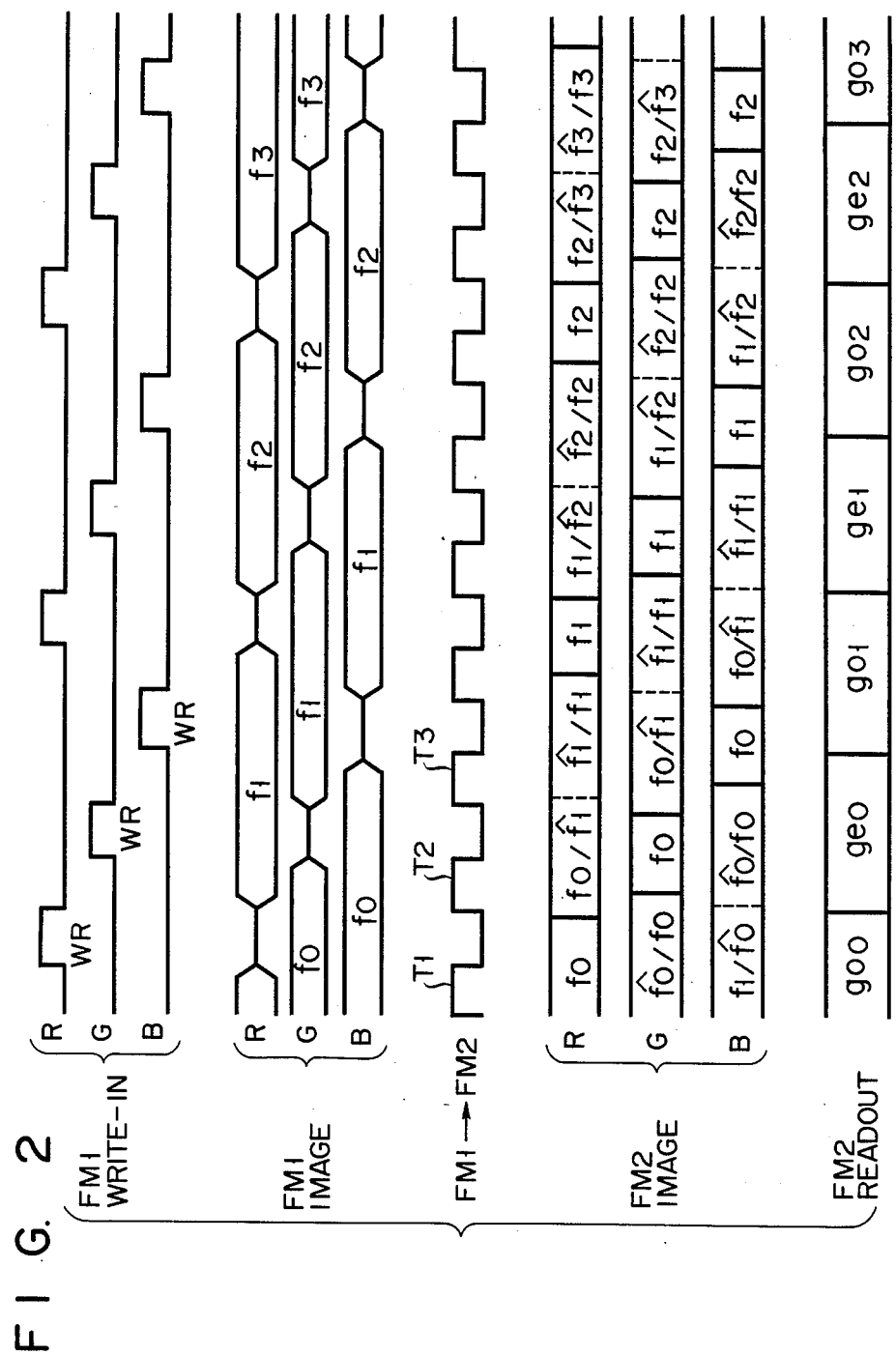
FIG. 2 is a time chart for illustrating the operation of the photographing apparatus of FIG. 1.
Figure 3:
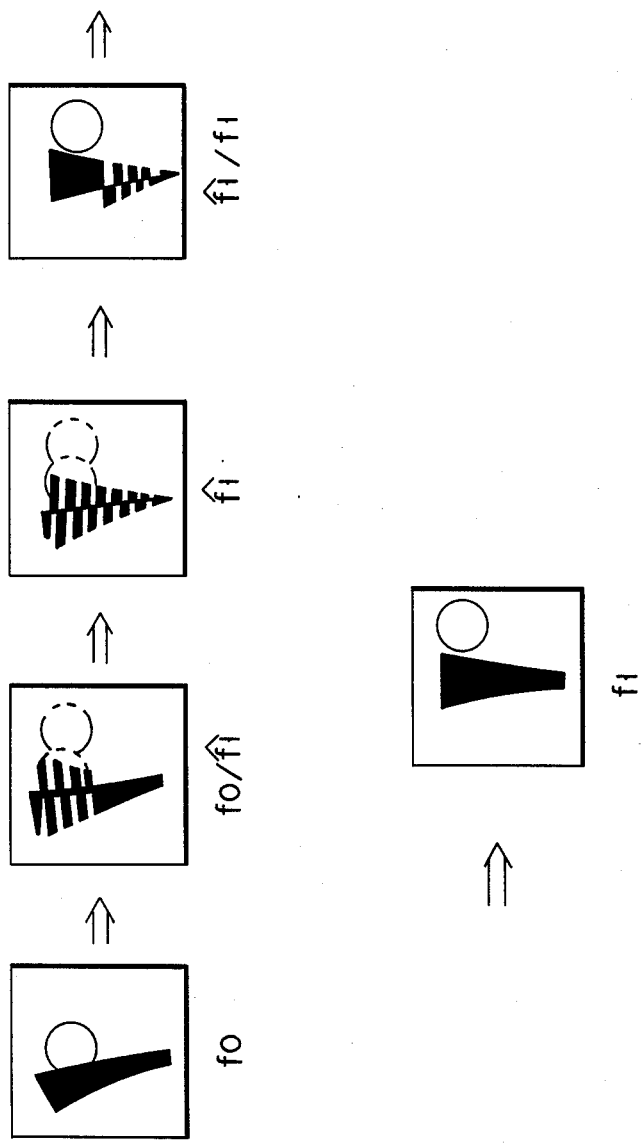
FIG. 3 shows images indicative of the manner of updating image signals in post-stage frame memories.

In the circuit described above, the R, G and B image signals, delivered from CCD 11, in synchronism with drive signals from driver 21, according to the frame-sequential system, are applied to the input of pre-processor 12. In the frame-sequential system, the R, G and B image signals are produced by rotating a rotating filter, in which three colors, i.e., red, green, and blue, are arranged in regular sequence. Pre-processor 12 serves to delay the image signals in accordance with the length of a transmission path, in an endoscope. The path length depends on the type of the endoscope. The construction of pre-processor 12 will be described in detail later. The R, G and B image signals are delivered in succession, at intervals of 1/90 second, in response to the drive signals from driver 21 controlled by controller 20. After they are processed by pre-processor 12, these signals are converted into digital image signals by A/D converter 13 controlled by sampling pulses supplied from controller 20. The R, G and B image signals, delivered successively at intervals of 1/90 second from converter 13, are written in pre-stage frame memories 15R, 15G and 15B through switches 14R, 14G and 14B, respectively, with a timing shown in the timing chart of FIG. 2. When the R, G and B image signals are stored in memories 15R, 15G and 15B for one frame, they are read out therefrom by the interlacing method, that is, with every other scanning line, and then transferred to post-stage frame memories 16R, 16G and 16B. The transfer to memories 16R, 16G and 16B is accomplished during a period off a write-in period WR for pre-stage frame memories FM1, as indicated as FM1-FM2 transfer timing in FIG. 2. The transferred image signals are stored in memories FM2 by the interlacing method under the control of controller 20. In this case, as the image changes from f0 to f1, for example, the stored contents of the R frame memory are rewritten successively by the interlacing method, thus providing image signals which vary in the order of f0, f0/f1, f1/f1, and f1, as shown in the time chart of FIG. 2. FIG. 3 shows images corresponding to these image signals. At the beginning, image f0 for one established frame is stored in frame memories FM2. When the contents of memories FM2 are rewritten by the interlacing method, images f0 and f1 are mixed by the interlacing method. The images change in three steps; rewriting of a first field (f0/f1), end of rewriting of the first field (f1), and rewriting of a second field (f1/f1). Thereafter, they change into established image signals corresponding to image f1. The R, G and B image signals for one frame of post-stage frame memories 16R, 16G and 16B, rewritten every moment as aforesaid, are read out as go0 (odd-number field) and ge0 (even-number field), at intervals of 1/60 second, in synchronism with television synchronizing signals outputted from controller 20, by the interlacing method. The R, G and B image signals are supplied to post-processors 18R, 18G and 18B through D/A converters 17R, 17G and 17B, respectively, and are processed by the post-processors. Thereafter, the processed image signals are supplied to monitor 19, and displayed as a color picture. In this case, the displayed image moves gradually as the frame shifts from f0 to f1, as shown in FIG. 3. Although this image may look somewhat out of focus, it is a considerably clear image without flickers, since it can be watched as a moving color picture.

According to the present invention, the image signals from the pre-stage frame memories are read out by the interlacing method, and transferred to the post-stage frame memories, to be stored therein by the interlacing method. If the image changes quickly between the frames, therefore, it varies gradually when it is read from the post-stage frame memories and displayed on the monitor. Thus, the displayed picture is a clear picture without any substantial flickers.

Figure 4:
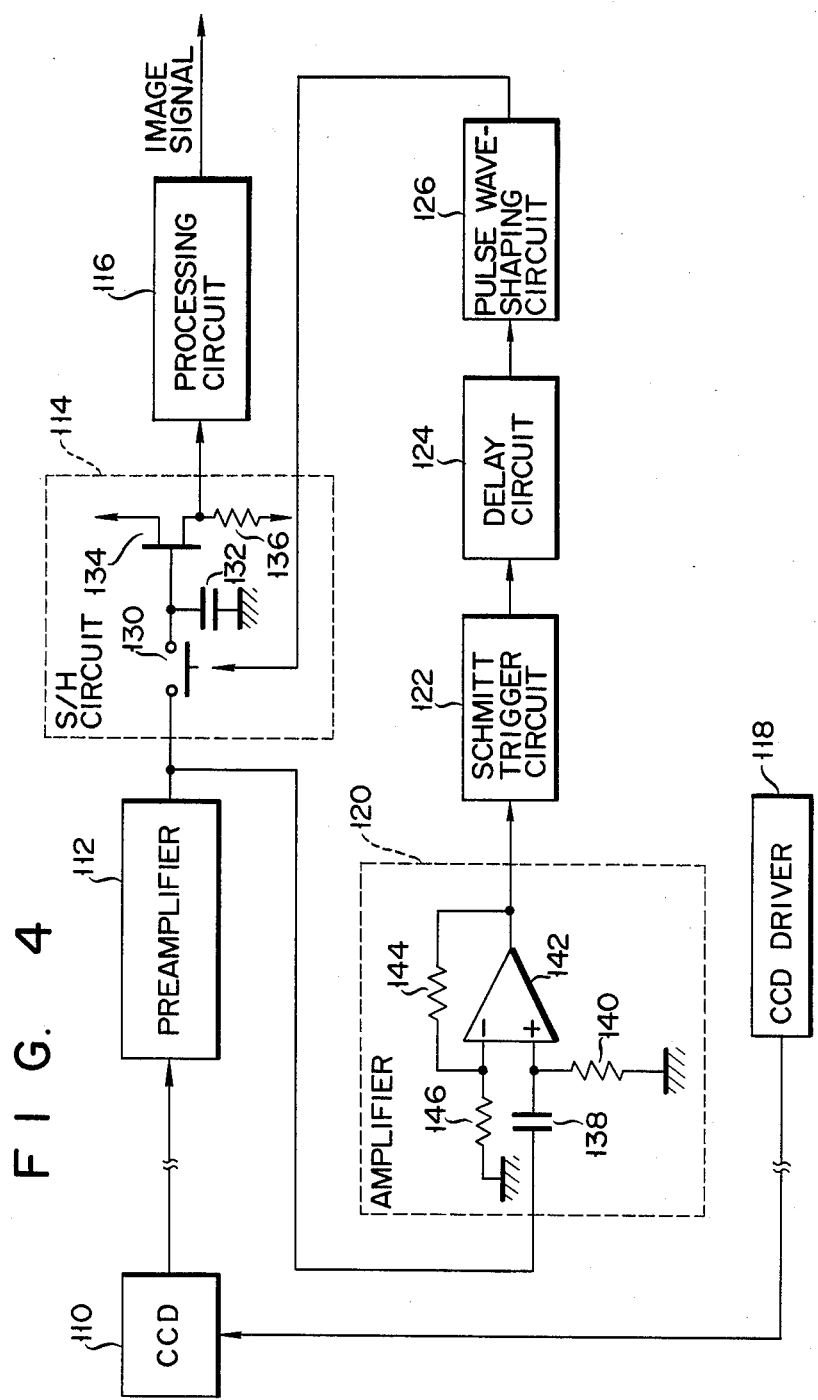
FIG. 4 is a block circuit diagram of a preprocessor system.

The above described pre-processor is constructed as shown in FIG. 4. A video signal from CCD 110 is transmitted through the transmission cable of the endoscope to an external video processing circuit, which is independent of CCD 110 shown in FIG. 4. The video signal is first applied to the input of preamplifier 112. The output of preamplifier 112 is supplied to processing circuit 116 via S/H circuit 114, and to Schmitt trigger circuit 122 via amplifier 120. CCD driver 118 is provided in the video processing circuit, and drive pulses from driver 118 are supplied to CCD 110. The output of trigger circuit 122 is supplied, as sampling pulses, to circuit 114 through pulse wave-shaping circuit 126.

S/H circuit 114 includes capacitor 132 connected to preamplifier 112 through analog switch 130, transistor 134 for supplying discharge current of capacitor 132 to processing circuit 116 in the next stage, and resistor 136. The sampling pulses, delivered from pulse waveshaping circuit 126, are supplied to a control terminal of switch 130.

Amplifier 120 includes differential amplifier 142, and the output of preamplifier 112 is applied to a positive input terminal of amplifier 142. An output signal from amplifier 142 is supplied to its own negative input terminal through feedback resistor 144. The positive and negative input terminals of amplifier 142 are grounded through resistors 140 and 146, respectively.

Referring now to FIG. 5, the operation of the aforementioned apparatus will be described. The video signal, transmitted through preamplifier 112, is negative signal a, as shown in FIG. 5. In this embodiment, signal a is carried by a carrier signal of 7.16 MHz. It is amplified to a negative saturation level by amplifier 120, and then supplied to Schmitt trigger circuit 122. Circuit 122 shapes the wave of its input signal, and delivers square wave signal b, as shown in FIG. 5.

Preferably, S/H circuit 114 samples and holds the video signal at its negative peak. As seen from FIG. 2, the negative peak never fails to appear with a predetermined delay, after the trailing edge of the output pulse of Schmitt trigger circuit 122. Thus, the time for the negative peak is obtained by delaying the output signal of circuit 122 for the predetermined time. In this embodiment, the negative peak appears with a delay of approximately 35 nanoseconds after the trailing edge of the output pulse of circuit 122. In other words, the delay time of delay circuit 124 is about 35 nanoseconds. The sampling period of S/H circuit 114 should preferably be short. Pulse wave-shaping shaping circuit 126 detects the trailing edge of the output pulse of delay circuit 124, and produces sampling pulses d with a narrow pulse width, as shown in FIG. 5. Pulses d are supplied to the control terminal of analog switch 130.

Thus, according to the present embodiment, a video signal, supplied from the solid-state image sensor at the distal end of the endoscope, is processed on the basis of the timing of a delayed version of a signal, obtained by wave-shaping the video signal. As a result, the signal processing timing can be prevented from being lagged by a delay of the video signal, during the period when the signal is transferred from the image sensor to the video processing circuit. Even though the type of the endoscope, the length of the transmission path, and the delay time vary, the frequency of the video signal never changes. Accordingly, the timing of the output pulse of Schmitt trigger circuit 122 cannot change, so that the sampling timing is free from a lag.

The sampling pulses, obtained in this manner, can be applied to the timing of other processes of the video processing system, as well as to the sampling timing of the S/H circuit. An A/D converter is required in digitizing the video signal, for example. The sampling pulses can be used also as clock pulses for the analog-to-digital conversion. Thus, the timing of every process of the video system can be provided on the basis of the sampling pulses.

Figure 6:
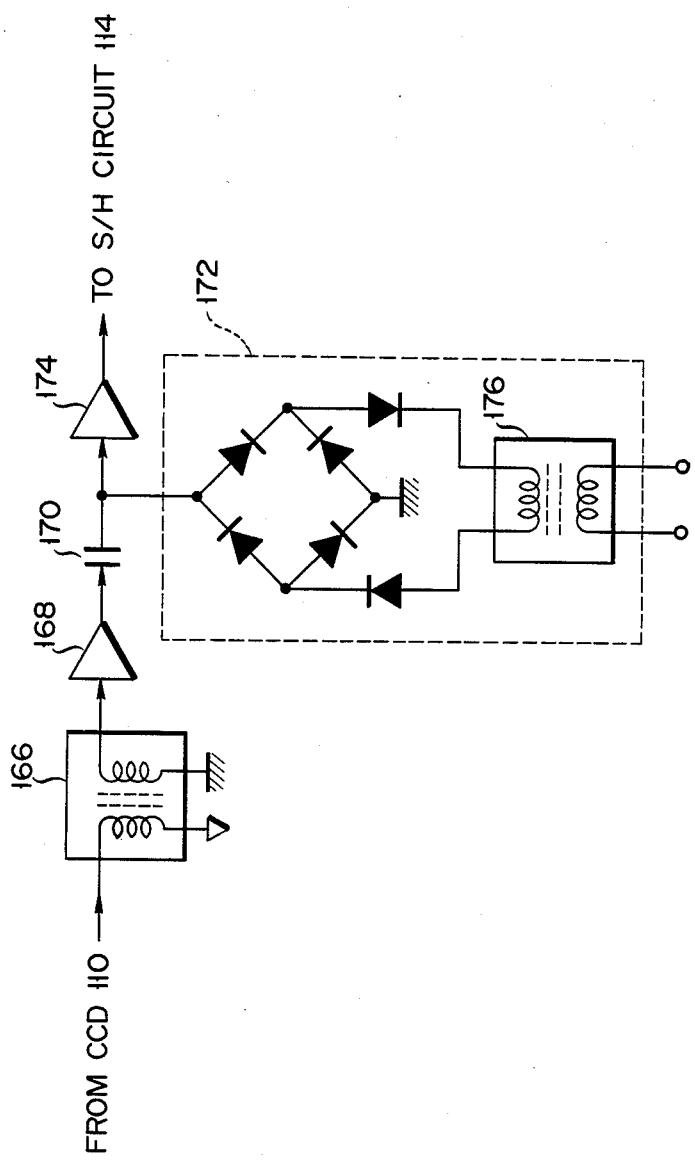
FIG. 6 is a circuit diagram of a clamping circuit in a preamplifier shown in FIG. 4.

Moreover, the sampling pulses can be used as clamping pulses when a clamping circuit is provided in pre-amplifier 112. FIG. 6 shows an example of the clamping circuit. The video signal from CCD 110 is supplied to the video processing system (S/H circuit 114) through isolation transformer 166, impedance transducer 168, capacitor 170, and impedance transducer 174. Dynamic clamping circuit 172 is connected between capacitor 170 and transducer 174. Circuit 172 includes an analog switch, formed of bridge-connected diodes, and self-bias transformer 176 for supplying a pulsating bias current to the switch. The sampling pulses are supplied to transformer 176, and the video signal from CCD 110 is clamped in response to these pulses.

The present invention is not limited to the endoscopic apparatus described above, and may be applied to all television camera apparatuses in which a camera head is provided independently of a video processing circuit.

As described herein, the video signal, transmitted from the remote solid-state image sensor, is processed on the basis of the timing of a delayed version of a signal, obtained by wave-shaping the video signal. Thus, the signal processing timing can be prevented from being lagged by a delay of the video signal, during the period when the signal is transferred from the image sensor to the video processing circuit.

The endoscopic photographing apparatus, according to the embodiment described above, comprises an endoscopic light source unit, which is controlled by a CPU. The CPU is provided with means for temporarily resetting the CPU, in response to application of the power supply or start of ignition. The resetting is done, in order to prevent the CPU from operating unexpectedly, influenced by noises produced when the power is turned on, or when an ignition circuit for the light source is actuated. The resetting means resets the CPU when the power is turned on, and sets it after a predetermined time. If specific data, e.g., patient's data, are inputted by key operation, after the energizing of the CPU, they are displayed on the monitor. When an ignition switch is activated to turn on the light source, after checking all the inputted patient's data on the monitor, the CPU is reset again in response to the start of ignition. When the CPU is reset in this manner, the previously inputted patient's data are cleared, so that the displayed data on the monitor are also cleared. When the CPU is set again, therefore, the patient's data must be inputted again by key operation.

Figure 7:
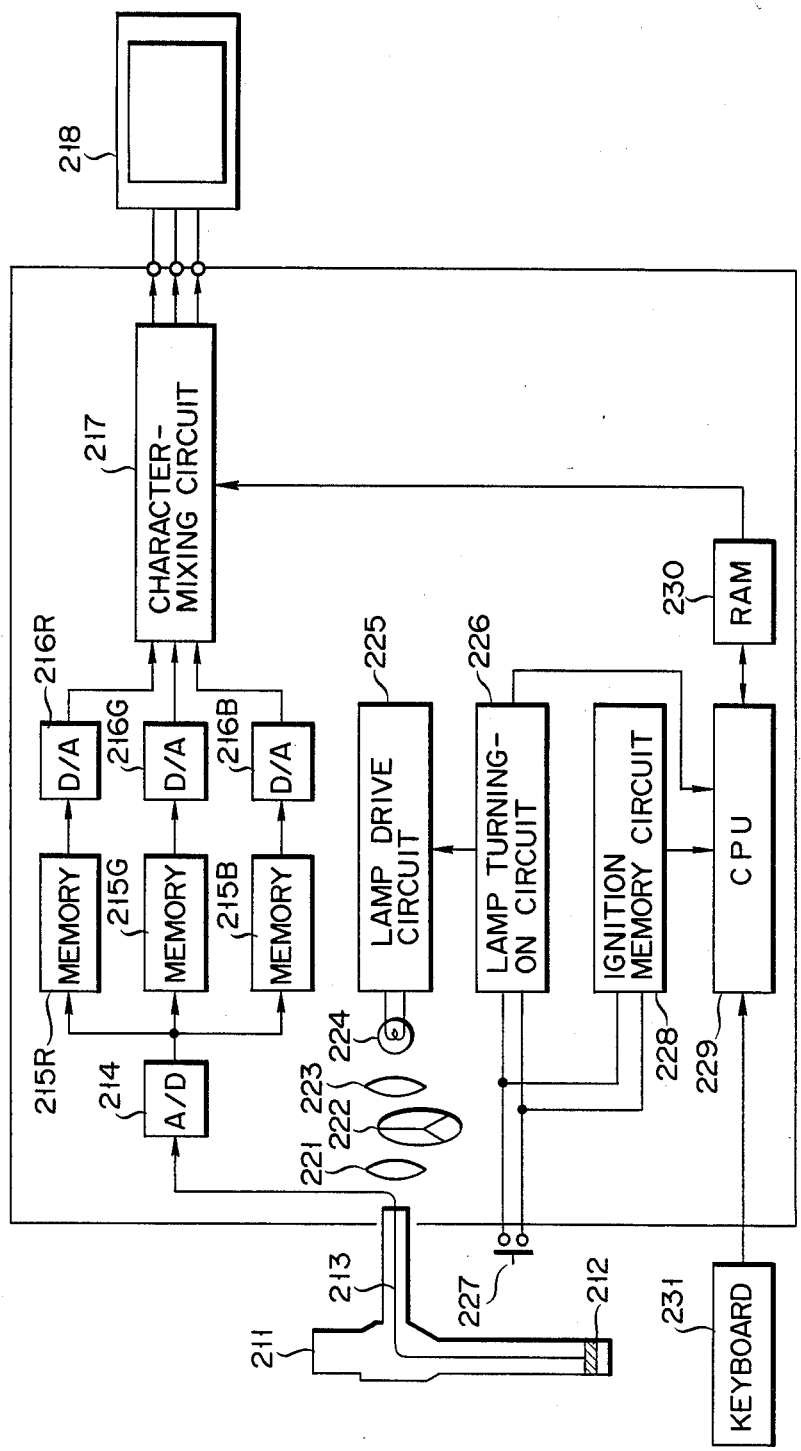
FIG. 7 is a block circuit diagram of the endoscopic photographing apparatus, including a light source system.

In order to avoid such an awkward situation, the light source unit, used in the photographing apparatus of the present invention, is constructed as follows. As shown in FIG. 7, CCD 212, incorporated in endoscope 211, is connected to A/D converter 214 by means of image signal line 213. The output of converter 214 is connected to frame memories 215R, 215G and 215B. The readout sections of R, G and B frame memories 215R, 215G and 215B are connected to character-mixing circuit 217 through D/A converters 216R, 216G and 216B, respectively.

Lens 221, three-color filter 222, lens 223, and light-source lamp 224 are arranged in succession, facing a light guide (not shown) of endoscope 211. Lamp 224 is connected to lamp drive circuit 225. Circuit 225 is designed so as to be actuated in response to the output of lamp turning-on circuit 226. Circuit 226 is connected with ignition switch 227, which is connected also to ignition memory circuit 228. Circuit 228 can be formed of a flip-flop, which is set or reset when switch 227 is turned on or off. Circuits 226 and 228 are connected to CPU 229. CPU 229 is connected with RAM 230, which stores display data, such as patient's data. RAM 230 is connected to character-mixing circuit 217. Also, keyboard 231 for inputting the patient's data is connected to CPU 229.

Figure 8:
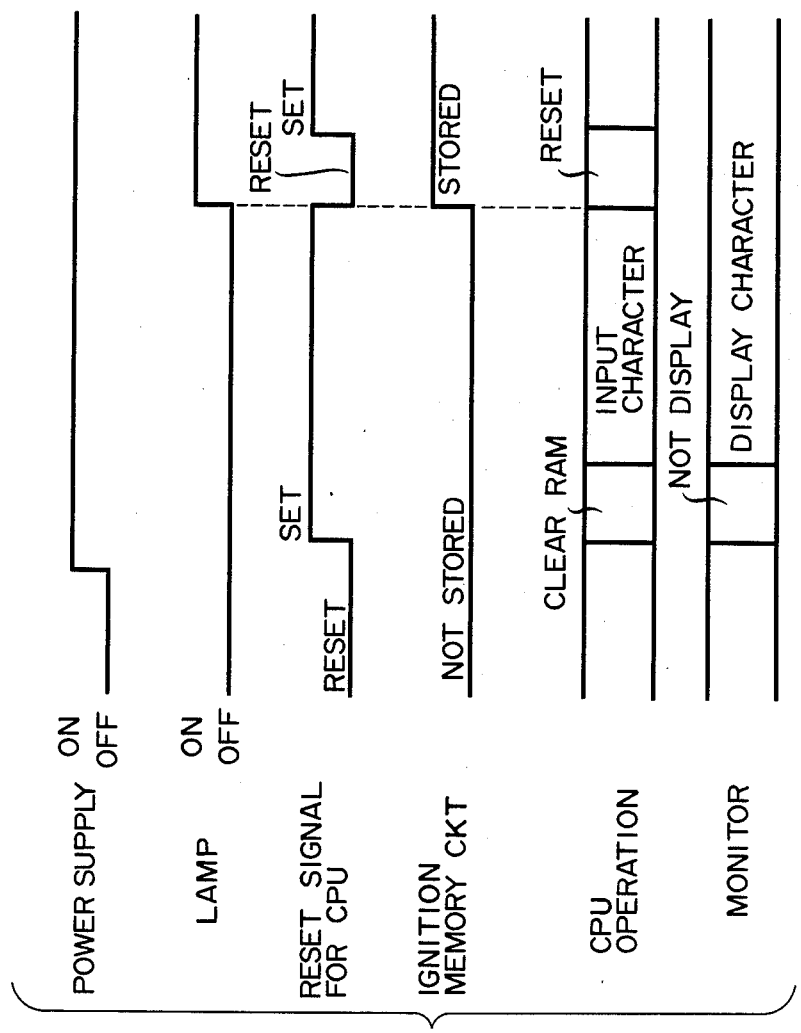
FIG. 8 is a time chart for illustrating the operation of the circuit of FIG. 7.
Figure 9:
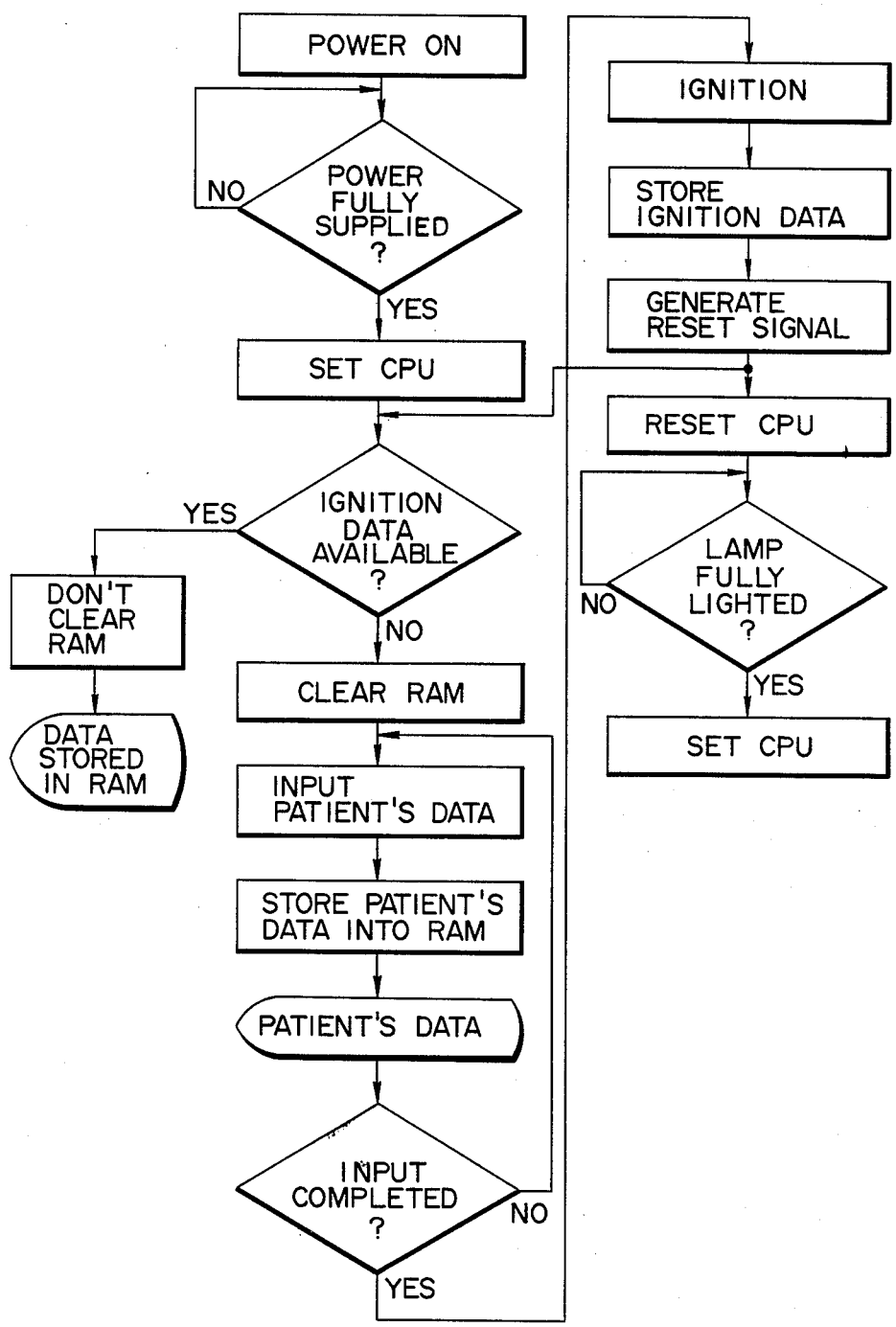
FIG. 9 is a flow chart for illustrating the operation of the circuit of FIG. 7.

Referring now to the timing chart of FIG. 8 and the flow chart of FIG. 9, the operation of the aforementioned endoscopic light source unit will be described. CPU 229 is reset before the power is turned on. It is set after the passage of the rise time of the power supply. Thereupon, CPU 229 first detects the memory contents of ignition memory circuit 228, thereby determining whether ignition is accomplished or not. If ignition information is not stored in circuit 228, RAM 230 is cleared. If patient's data are inputted through keyboard 231, in this state, they are stored in RAM 230 through CPU 229. The data in RAM 230 are supplied to character-mixing circuit 217, whereupon they are converted into character data and supplied to monitor 218. Then, monitor 218 displays the key-inputted patient's data in characters, including the patient number, patient's name, sex, age, etc. After all the patient's data are inputted, light-source lamp 224 is turned on, for the start of an endoscopic diagnosis. At the same time, ignition switch 227 is turned on. Lamp turning-on circuit 226 is actuated by an on-signal, while ignition data is stored in ignition memory circuit 228. Circuit 226 supplies a turning-on signal to lamp drive circuit 225. In response to this signal, circuit 225 turns on lamp 224. At this time, circuit 226 supplies a reset signal to CPU 229. In response to the reset signal, CPU 229 is reset, while it detects the ignition data of ignition memory circuit 228, thereby prohibiting RAM 230 from being cleared. Even though CPU 229 is reset, therefore, the patient's data are held in RAM 230, and keeps on being displayed on monitor 218.

When light-source lamp 224 is lighted to a predetermined brightness, CPU 229 is set again. Light from lamp 226 is transmitted through lens 224, three-color rotating filter 222, and lens 221, to be incident on the light guide of endoscope 211. Solid-state image sensor 212 of endoscope 211 produces R, G and B image signals according to the frame-sequential system, and applies them to A/D converter 214 through signal line 213. The image signals are stored temporarily in their corresponding frame memories 215R, 215G and 215B, and then applied to character-mixing circuit 217 via D/A converters 216R, 216G and 216B. Circuit 217 mixes the endoscopic image signals with the patient's data in RAM 230, and delivers the mixed data to monitor 218. Thereupon, monitor displays an endoscopic image, along with the patient's data.

In displaying the image on the monitor, or recording the image in an image filing device, according to the above described embodiment, character data corresponding to the image, e.g., data indicative of the patient number, patient's name, sex, etc., are inputted. In this case, the image is displayed on the right-hand half of the monitor, and guidance information, including a plurality of items for the input data, is indicated on the left-hand half. The patient's data are inputted in accordance with the individual items of the guidance information. The guidance items should be erased, thereafter, for a better indication of the patient's data, and to provide room for additional data. Thereupon, the present invention provides an apparatus with an improved character data-processing section, as described below.

Figure 10:
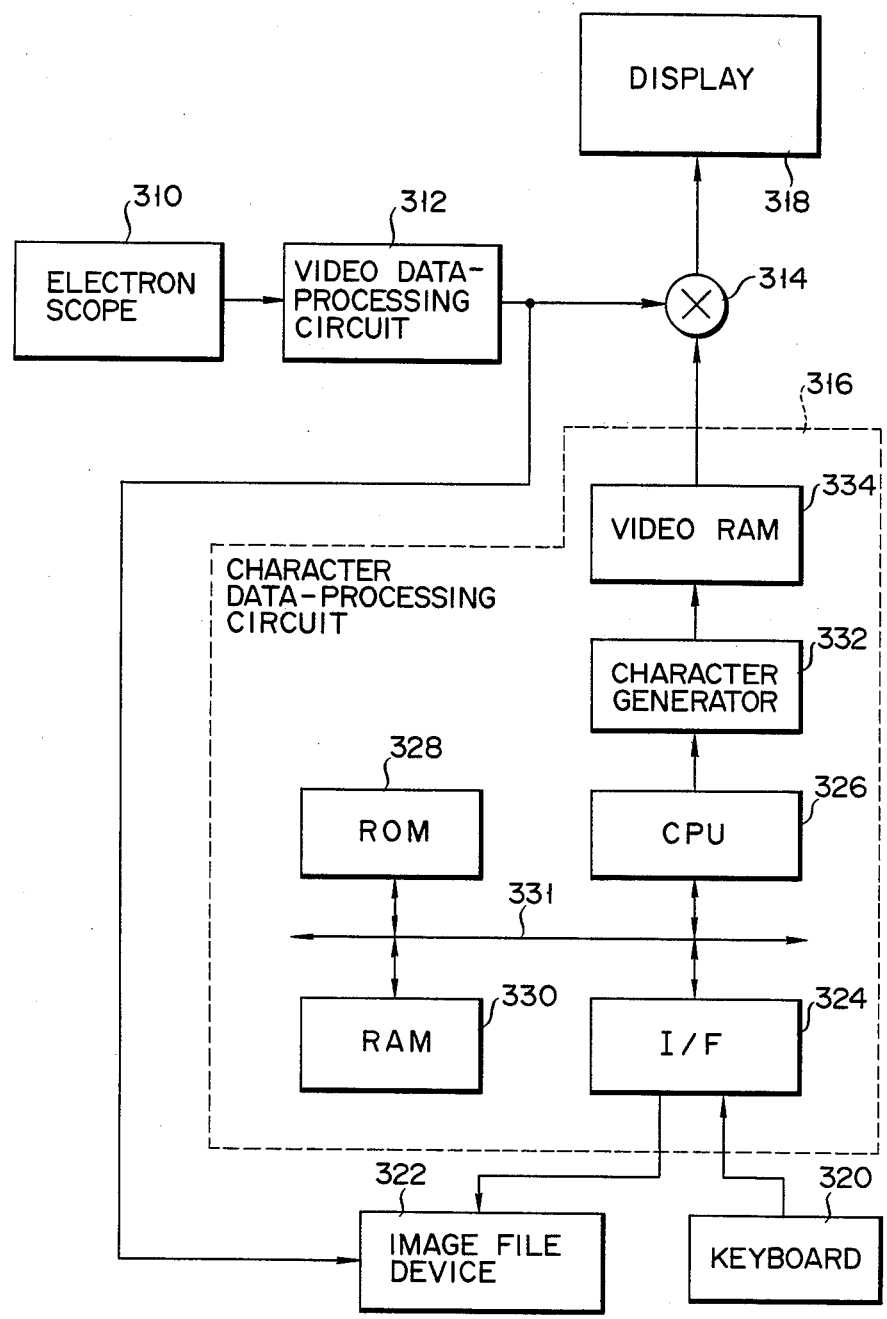
FIG. 10 is a block circuit diagram of the endoscopic photographing apparatus, including a character data-processing circuit.

Referring now to FIG. 10, there is shown an electron scope 310 in which a solid-state image sensor, such as a CCD, is contained in the distal end of an endoscope, whereby a subject is photographed. An output image signal from scope 310 is applied to the input of video dataprocessing circuit 312. Circuit 312 executes various processes, such as an addition of a synchronizing signal to the image signal, thereby converting the image signal into a signal of a suitable form for the display. Video data delivered from circuit 312 is supplied to a first input terminal of mixer 314.

A second input terminal of mixer 314 is supplied with character data delivered from character dataprocessing circuit 316. Mixer 314 mixes the character data with the video data, and supplies the mixed data to display 318, formed of a CRT monitor. The video and character data are synthesized so that they are indicated individually on two halves of the screen of display 318. In order to maintain the image on display 318, image filing device 322, such as an optical disk device, is connected to the output terminal of video data-processing circuit 312.

Character data-processing circuit 316 comprises interface (I/F) 324, central processing unit (CPU) 326, read-only memory (ROM) 328, random access memory (RAM) 330, character generator 332, and video RAM 334. I/F 324, ROM 328, and RAM 330 are connected to CPU 326 by means of bus 331. ROM 328 is stored with a control program of CPU 326 and guidance items for item data to be inputted by an operator. I/F 324 is connected with keyboard 320, through which the item data, corresponding to the individual guidance items, are inputted.

Output data from CPU 326 are applied to character generator 332, and character patterns produced by the generator are stored in a predetermined region of video RAM 334. The output of RAM 334 is supplied, as output character data of character data-processing circuit 316, to mixer 314. Image filing device 322 is connected to circuit 316 via I/F 324, and the item data inputted through keyboard 320 are supplied to device 322. Thus, the item data, along with output video data from video data-processing circuit 312, are preserved in the optical disk device.

Figure 11:
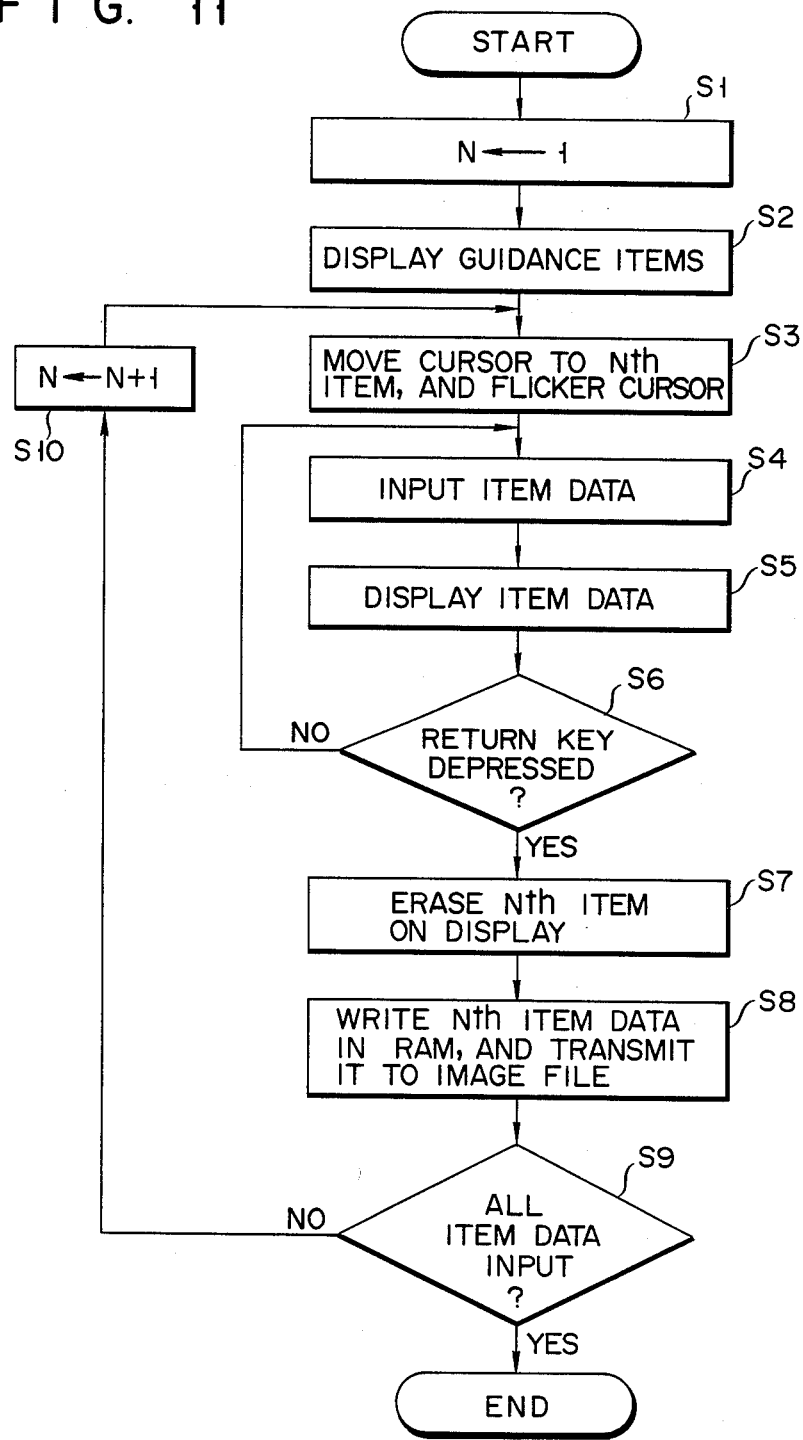
FIG. 11 is a flow chart for illustrating the operation of the block circuit of FIG. 10.

Referring now to the flow chart of FIG. 11, the operation of the apparatus of this embodiment will be described. When the power is on, the video data from electronic scope 310 is always displayed, as a moving picture, on the right-hand half of the screen of display 318. The flow chart of FIG. 11 shows the operation for inputting the character data to be indicated on the left-hand half of the display screen.

In step S1, 1 is set in parameter N, which is a parameter related to the number of input data, as mentioned later.

In step S2, all the guidance items, corresponding to the item data to be inputted by the operator, are indicated on the left-hand half of the screen of display 318, for data input guidance. This indication is accomplished by causing character generator 322 to produce the character patterns for the guidance items, on the basis of data in ROM 328, and then storing the patterns in the predetermined region of video RAM 334, corresponding to the left-hand half of the display screen. The character patterns are transmitted from RAM 334 to display 318, to be indicated thereon. Each guidance item is displayed in a line, and its corresponding item data is indicated just under the line.

Figure 12:
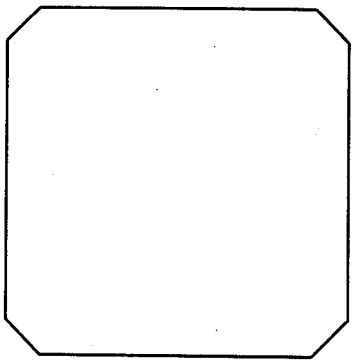
FIGS. 12 and 13 show a monitor screen.

In step S3, a cursor is moved to the head of that line next to the line for an nth guidance item, displayed on the screen, and it is flickered there. FIG. 12 shows the state of the screen of display 318 at this point of time. In this case, the guidance items include the patient number, patient's name, sex/age, date of birth, and remarks.

In step S4, the operator inputs the item data corresponding to the nth guidance item, under which the cursor is flickering. In step S5, the inputted item data is displayed from left to right, on the line next to the line carrying the nth guidance item.

In step S6, whether or not the entire nth item data has been inputted is determined. The end of the data input is detected when a return key is depressed. If the data input is not complete, step S4 and the subsequent steps are executed again.

If the data input is concluded to have been completed, the nth guidance item, corresponding to the just inputted data, is erased from the screen of display 318, in step S7. This is accomplished by erasing the character pattern data for the nth guidance item, in video RAM 334.

In step S8, the inputted item data, corresponding to the nth guidance item, is registered in RAM 330, and transmitted to image filing device 322 through I/F 324.

Figure 13:
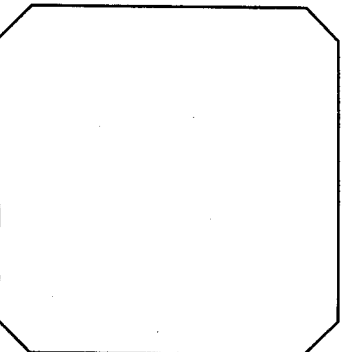
Figure 14A:
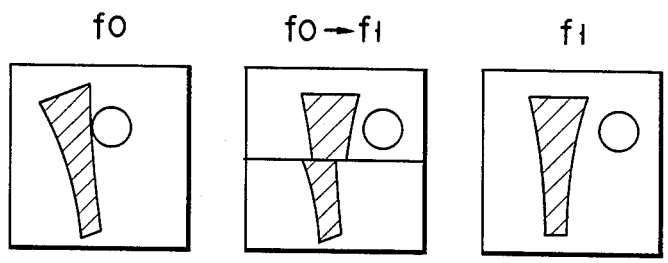
FIGS. 14A and 14B show pictures displayed by a prior art photographing apparatus.
Figure 14B:
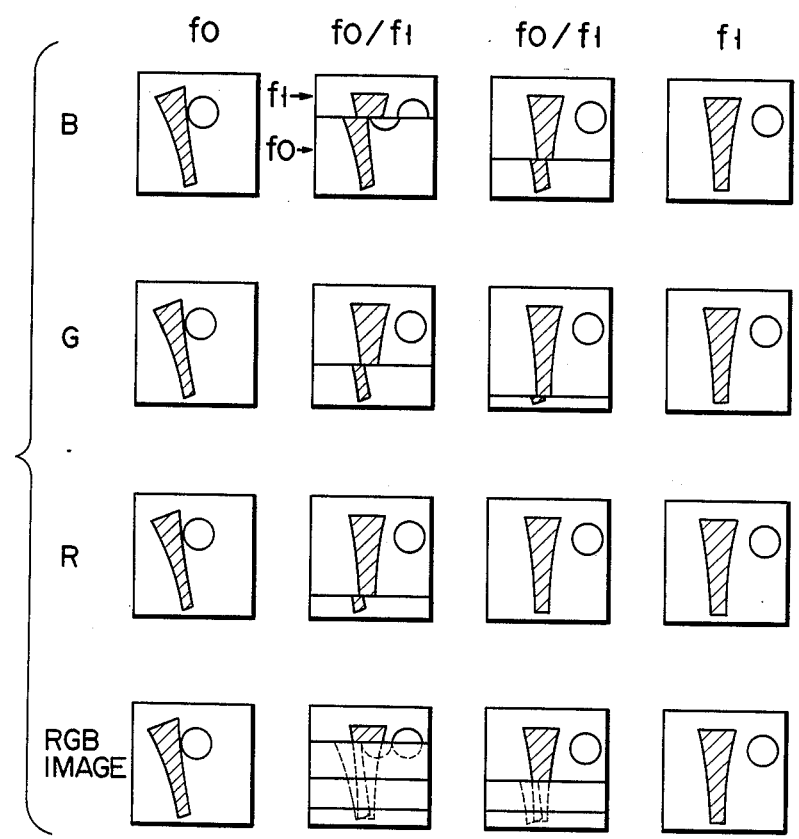

In step S9, whether or not all the item data have been inputted is determined. If the input of all the item data is not complete, 1 is added to parameter N in step S10, and step S3 and the subsequent steps are executed again. If the input of all the item data is concluded to have been completed, the input operation for the character data is finished. FIG. 13 shows the state of the screen of display 318 at this point of time. In this state, only the item data are displayed, that is, the guidance items are not on the display.

According to the embodiment of the present invention, as described above, all guidance items are displayed before their corresponding item data are inputted. When the data input is completed, the guidance items are erased from the display, and only the inputted item data are displayed. Thus, the item data can be noticed more easily. In the above embodiment, the guidance items on the display are erased one after another, after their corresponding item data are inputted. Alternatively, however, they may be erased together after all the item data are inputted.

In the embodiment described above, moreover, the item data are inputted one by one, through the keyboard, during the image display for diagnosis. Alternatively, however, the item data may be inputted in advance of the diagnosis, so that they can be read out by only inputting the data numbers, during the diagnosis.

According to this system, the data input and registration can be accomplished quickly, thus minimizing the effect of the passage of time on the result of the diagnosis. This system is particularly serviceable when displaying optional data for each patient on the display screen. In this case, the guidance items on the screen include optional data 1, 2, ..., and n. The number and details of the optional data can be changed freely as required.

What is claimed is:

1. An endoscopic photographing apparatus comprising:
   image signal circuit means provided in an endoscope and including an image sensor for successively generating image signals, with every scanning line;
   first memory means for successively storing the image signals, in synchronism with drive signals for driving said image sensor;
   first readout means for successively reading the image signals from the first memory means by the interlacing method;
   second memory means for successively storing the image signals, read by the readout means, by the interlacing method; and
   an output section including second readout means for reading the image signals from the second memory means, in synchronism with television synchronizing signals.

2. The endoscopic photographing apparatus according to claim 1, wherein said image signal circuit means includes said image sensor for successively delivering R, G and B color image signals, and pre-processor means for processing the color image signals from said image sensor, and delivering output signals to said first memory means, connected to the second memory means.

3. The endoscopic photographing apparatus according to claim 2, wherein said first memory means includes a plurality of first frame memories for individually storing the R, G and B color image signals from said image signal circuit means, and delivering the color image signals to the second memory means.

4. The endoscopic photographing apparatus according to claim 3, wherein said second memory means includes a plurality of second frame memories for individually storing the R, G and B color image signals from the first frame memories.

5. The endoscopic photographing apparatus according to claim 1, wherein said pre-processor means includes means for wave-shaping the image signals from the image sensor and delivering pulse signals, delay means for delaying the pulse signals from the wave-shaping means, in accordance with the length of the endoscope, and delivering delayed pulse signals, and means for sampling the image signals in synchronism with the delayed pulse signals from the delay means.

6. The endoscopic photographing apparatus according to claim 1, wherein said output section includes character information output means for delivering character information on the image signals, character information mixing means for mixing the image signals read by said second readout means with the character information from said character information output means, and delivering character-mixed image signals, and monitor means for displaying the character-mixed image slgnals from the mixing means, as an image.

7. The endoscopic photographing apparatus according to claim 6, wherein said character information output means includes output means for delivering guidance information for the required character information, and means for erasing the guidance information, in response to the input of the character information corresponding to the guidance information.

8. An endoscopic photographing apparatus comprising:
   image signal circuit means provided in an endoscope and including an image sensor for successively generating image signals, with every scanning line;
   light source means including light source means, supplied with electric power from a power source, and adapted to emit an illumination light to be supplied to the endoscope, and turning-on circuit means for lighting the light source means;
   character information means supplied and stored with character information;
   CPU means for controlling the character information means and said light source means;
   means for resetting the CPU means in response to the start of said power supply and the actuation of said turning-on circuit means;
   means for storing turning-on start information in response to the actuation of the turning-on circuit means;
   means for holding the character information in response to the turning-on start information;
   memory means for successively storing the image signals, in synchronism with drive signals for driving said image sensor; and
   an output section for reading the image signals from said memory means, in synchronism with television synchronizing signals.

* * * * *